United States Patent Office 2,958,828
Patented Nov. 1, 1960

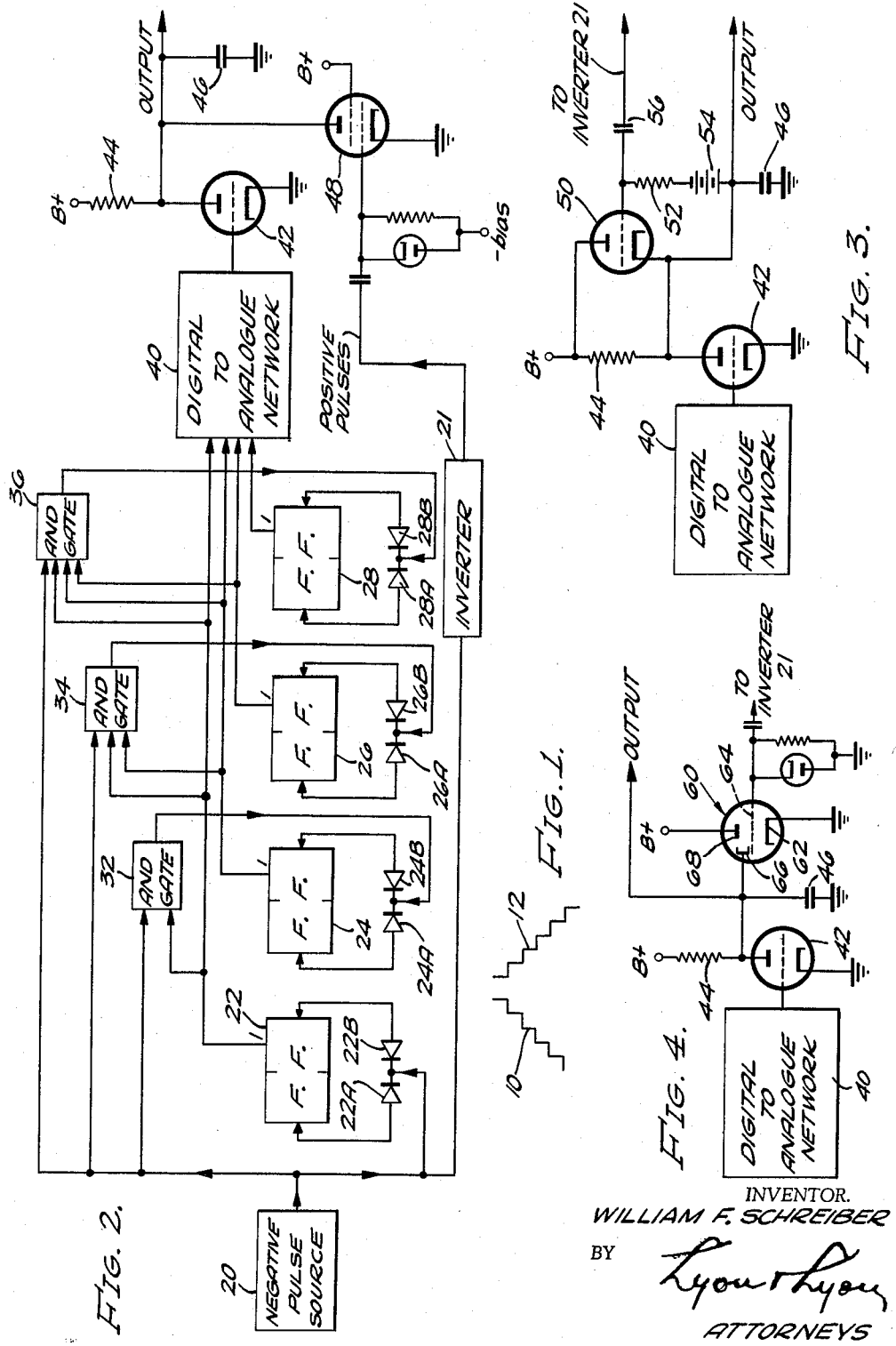

2,958,828

HIGH-SPEED STAIRCASE WAVE SHAPE GENERATOR

William F. Schreiber, North Hollywood, Calif., assignor to Technicolor Corporation, Hollywood, Calif., a corporation of Maine Filed Mar. 24, 1958, Ser. No. 723,287

6 Claims. (Cl. 328—186)

This invention relates to electrical wave shape generators and more particularly to an improved staircase wave shape generator.

The output of staircase wave shape generators are usually employed for providing deflection voltage for cathode ray tube apparatus. There are two well-known types of staircase wave shape generators, an analogue type and a digital type. An analogue type is illustrated, for example in the text "Waveforms" by Britton Chance, et al.; on page 614 et. seq. published by the McGraw-Hill Book Co. This type employs a capacitor which is charged by introducing pulses of current from a constant current source. Although this method produces an excellent staircase wave shape with a stepping time on the order of the pulse width, it is excessively dependent on pulse shape for its purpose. A digital type of staircase generator is found, described by Eckert, et al. in "The Proceedings of the Institute of Radio Engineers," vol. 38, pages 498–510, May 1950. In this arrangement the input pulses to the generator are applied to a binary counter so that at any instant the state of the binary counter is the binary representation of the number of input pulses which have been received since the start of the operation. The digital to analogue converter consisting of a weighted current or voltage adder is connected to the various stages of the counter, whereby the binary number is converted to a voltage proportional to the number of pulses received.

The digital staircase generator has a very high accuracy. However, in order for the output to change one step, several or even all of the counter stages must turn over, and this requires that the value of current or voltage being supplied by each stage to the adder must settle to its quiescent value. Until all the currents or voltages reach their final quiescent value, the output voltage will execute a corresponding transient. The more steps required and the higher the frequency of the input pulses, the worse the transient becomes. This has provided a limiting factor in the operation of electrostatic storage tubes, since transition times below several tenths of a microsecond have not been obtainable.

An object of this invention is to provide a staircase wave shape generator which can operate more rapidly than those known heretofore.

Another object of the present invention is to provide a staircase wave shape generator which provides an output which is substantially free of transients and other spurious signals.

Another object of the present invention is to provide a staircase generator wherein the absolute level of the $n$th step of the staircase is maintained and is independent of the stepping frequency of the input pulses, as well as of the input pulse shape and amplitude.

Yet another object of the present invention is the provision of a novel, useful, and simple staircase wave shape generator.

These and other objects of the present invention are achieved by combining the best characteristics of the analogue or capacitor charging type of staircase wave shape generator and the digital staircase wave shape generators so that a result is obtained having the rapid rise time and freedom from transients of the analogue type and the accuracy of the digital type. This is accomplished by effectively generating staircases through both analogue and digital means and applying the staircase generated by analogue means through a high-pass filter and the staircase generated by digital means through a low-pass filter. The two outputs are then added together. As a result, the edges of the well-formed analogue steps are added to the body of the digital waveform steps; the filter time constants are made just long enough to smooth out the transients of the digital waveform steps.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1 is a wave shape diagram of an ascending and descending staircase waveform;

Figure 2 is a combined block and circuit diagram of an embodiment of the invention for generating a down-going staircase;

Figure 3 shows a circuit diagram of an embodiment of the invention for generating an up-going staircase; and Figure 4 shows a circuit diagram of a second embodiment of an arrangement for generating an ascending staircase.

Referring now to Figure 1, there is shown an ascending stiarcase wave shape 10 and a descending staircase wave shape 12. These are being shown by way of illustrating the type of wave shape which it is desired to generate. The steps of the wave shape should be uniform with changes in levels occurring over an interval which is less than tenths of a microsecond. Further, the wave shape should be free of transients and other spurious signals.

Referring now to Figure 2, there may be seen a block and circuit diagram of an arrangement whereby the wave shapes shown in Figure 1 may be effectuated. Pulses are obtained from a source 20 which is represented here as a rectangle. This pulse source may be any source of pulses which may be keyed on by suitable well-known circuitry when it is desired to initiate the operation of the staircase wave shape generator. These pulses are applied to a counter, which may consist of as many binary counter stages 22, 24, 26, 28 as are desired. Only four of these stages are shown here by way of exemplification and not by way of limitation. In order to operate with as short a smoothing time constant as possible, it is necessary to make the digital staircase as good as possible. This requires that the various stages of the counter should trigger simultaneously. Such a requirement rules out the usual counter practice having each stage drive the next following stage, since, for example, in a 128-level generator, on step 63 the counter state will represent 1111110 and on step 64 the state will be 0000001. On transition, all seven stages must turn over. In a typical 7-stage counter capable of operating at about 10 megacycles, employing successive stage-driving technique, the delay time of three-tenths of a microsecond results in producing a transient well over three-tenths of a microsecond long.

A preferred arrangement for the counter is illustrated in Figure 2. In this arrangement, there is one AND gate 32, 34, 36 for each flip-flop stage after the first. Each gate is controlled by all the previous stages of the counter, as well as by the input pulse to the counter. In this manner, the delay time is made zero and all the stages trigger precisely simultaneously, since they have essentially parallel inputs.

The counter stages consist of the well-known flip-flop, or bistable state, trigger circuits, whereby an input is applied to both sides of each flip-flop, respectively, through diodes 22A, 22B, 24A, 24B, 26A, 26B, 28A, 28B. This causes the flip-flop to which the input is applied to be driven from one stable state to the other.

At the commencement of operation, all the flip-flops in the counter are in their zero-stable state. The gates are so arranged that in order to pass a pulse, all the inputs must have the value obtained when the flip-flops connected thereto are in their one-stable state. Hence, in the original condition, no pulses are passed. The first pulse drives flip-flop 22 to its one state, opening gate 32. The second pulse, therefore, drives flip-flop 24 to its one state as well as returning flip-flop 22 to its zero state. The third pulse drives flip-flop 22 to its one state. Now gates 32 and 34 are both open, so that, when a fourth pulse is received, flip-flop 22 is returned to its zero state, flip-flop 24 is driven back to its zero state, and flip-flop 26 is driven to its one state. The operation of the counter from the above description should be clear. It will be apparent that the number of pulses which are applied to the counter will be manifested by the stable conditions of the various stages of the counter as indicated by their outputs, which are applied to a digital-to-analogue network 40.

The digital-to-analogue network 40 includes an arrangement for converting the digital manifestation to an analogue voltage. These arrangements are well-known and are exemplified in the article by Eckert, et al., in the "Proceedings of the Institute of Radio Engineers." The output of the digital-analogue network 40 is a voltage representative of the count in the counter. This is applied to a first amplifier tube 42. A low-pass filter for the digital staircase wave shape which is applied to this tube is provided by the plate-load resistor 44 of this tube and an output capacitance 46. This output capacitance should preferably include the capacitance of the load. This, therefore, obviates the need for a very high-power amplifier to drive the load capacitance with a very fast rising voltage. It is furthermore convenient to use the same resistor and capacitor as the high-pass filter for the analogue staircase waveform, as this insures that the two time constants will be exactly equal.

A down-going analogue staircase could be generated by applying narrow, positive pulses obtained from negative-pulse source 20, through inverter 21, to the grid of tube 48, if tube 42 and resistor 44 were absent. The grid-voltage pulses would cause negative-current pulses to be drawn through capacitor 46, thus producing negative-voltage steps. When the resistor 44 and tube 42 are connected, the negative charge on capacitor 46 leaks off through the combined effective resistance of the tube and capacitor, producing on capacitor 46 a waveform exactly the same as if said analogue-staircase voltage were applied to a high-pass filter with time constant equal to the capacitance, multiplied by the effective resistance of resistor 44 and tube 42 in parallel. This is exactly the same time constant as the same circuit elements produce when they act as the low-pass filter for the digital staircase.

In order to obtain an up-going staircase, a similar arrangement to the one described may be employed. Figure 3 is a circuit for generating an up-going staircase. Here the digital-to-analogue network is arranged so that the opposite sides of the flip-flops as were used previously serve as inputs. As a result, the digital stairstep at the plate of the tube 42 will be an ascending one. Instead of the tube 48, as shown in Figure 2, a cathode-follower arrangement is employed. This includes the tube 50, which has its cathode connected to the anode of tube 42. Condenser 46 is also connected to the anode of tube 42. The grid of tube 50 is connected to the anode of tube 42, through a resistor 52 and a bias battery 54. The bias battery is required to maintain tube 50 cut off between pulses which are applied to its grid through a condenser 56. The values for resistor 52 and condenser 56 are selected to provide a time constant substantially shorter than intervals between the pulses being supplied from the pulse source 20. Condenser 46 will charge up with each succeeding current pulse permitted to pass through tube 50. Accordingly, the low-frequency portion of digital stairstep and the high-frequency portion of the analogue stairstep are added together on the plate of tube 42 and applied to the output.

A second method for generating the ascending staircase makes use of a secondary emission tube 60 for generating the analogue staircase. Such a tube, which is commercially purchasable, for example, the Philips EFP60, contains a cathode 62, a control grid 64, a dynode 66, and an anode 68. Electrons leave the cathode and are modulated by the grid in the ordinary manner. When they impinge on the dynode, secondary electrons are emitted and are collected by the anode, which is maintained at a voltage higher than the dynode. Since the secondary electron current is several times higher than the incident current, the net dynode current is positive. Furthermore, the magnitude of the dynode current is substantially independent of the dynode voltage over a substantial range—about 100 volts. As shown in Figure 4, the dynode of the secondary emission tube 52 is connected to the junction of resistor 44 and capacitor 46, and serves to introduce positive current pulses at this point in much the same way that cathode follower 50 serves the purpose in Figure 3.

In an embodiment of the invention which was constructed with a capacitive load on the order of 600 micro-microfarads and a plate resistor for tube 44 on the order of 2,000 ohms, a staircase wave shape generator was obtained which was capable of operating at about 10 megacycles with a rise time between .02 to .03 microsecond and with a transient-free output. There has been described and shown herein a novel, useful, staircase wave shape generator which is capable of operating faster and with greater accuracy than those known heretofore.

I claim:

1. A staircase wave shape generator comprising a digital means to generate a first voltage having a staircase wave shape, analogue means to generate a second voltage having a staircase wave shape, a low-pass filter, means to apply said first voltage to said low-pass filter, a high-pass filter, means to apply said second voltage to said high-pass filter, and means to add the outputs of said high- and low-pass filters to obtain a resultant voltage having a staircase wave shape.

2. A staircase wave shape generator comprising a digital counter, means to apply pulses to said digital counter to be counted, means to convert the count of said counter to a staircase wave shape voltage, a capacitor, means including said capacitor responsive to pulses from said means to apply pulses to said digital counter to generate a staircase wave shape voltage, and means to add both said staircase wave shape voltages to obtain a resultant staircase wave shape voltage.

3. A staircase wave shape generator comprising a digital counter, means to apply pulses to said counter to be counted, means to convert said counter output to a staircase wave shape voltage representative of the count of said counter, a first and a second tube each having an anode, cathode, and control grid, means to apply said staircase wave shape voltage to said first tube control grid, an anode load resistor connected to said first tube anode, a capacitor connected to said first tube anode, means connecting said second tube anode to said first tube anode, and means to render said second tube conductive each time a pulse is applied to said counter.

4. A staircase wave shape generator comprising a digital counter, means to apply pulses to said counter to be counted, means to convert said counter output to a staircase wave shape voltage representative of the count of said counter, a first and a second tube each having an anode, cathode, and control grid, means to apply said staircase wave shape voltage to said first tube control grid, an anode load resistor connected to said first tube anode, a capacitor connected to said first tube anode, means connecting said second tube cathode to said first tube anode, means to render said second tube conductive each time a pulse is applied to said counter, and bias means to maintain said second tube nonconductive during quiescent intervals.

5. A staircase wave shape generator as provided in claim 4 wherein said counter comprises a plurality of bistable counter stages, a different AND gate associated with each of said counter stages except the first, means connecting the output of each AND gate for driving a succeeding counter stage, means connecting the input to said counter to all of said AND gate inputs, and means connecting each AND gate to its associated counter stage and all preceding counter stages.

6. A staircase wave shape generator comprising a digital counter, means to apply pulses to said counter to be counted, means to convert said counter output to a staircase wave shape voltage representative of the count of said counter, a first tube having a cathode, grid, and anode, a second tube having a cathode, grid, dynode, and anode, means to apply said staircase wave shape voltage to said first tube control grid, an anode load resistor connected to said first tube anode, a capacitor connected to said first tube anode, means connecting said second tube dynode to said first tube anode, means to render said second tube conductive each time a pulse is applied to said counter, bias means to maintain said second tube nonconductive during quiescent intervals, and means to bias said anode of said second tube to a voltage having a value to insure collection by said anode of secondary electrons emitted by said dynode.

References Cited in the file of this patent

UNITED STATES PATENTS

| | | |
|---|---|---|
| 2,428,913 | Hulst | Oct. 14, 1947 |
| 2,709,770 | Hansen | May 31, 1955 |
| 2,739,234 | Houghton | Mar. 20, 1956 |
| 2,771,551 | Hampton | Nov. 20, 1956 |
| 2,858,434 | Tollefson | Oct. 28, 1958 |